United States Patent
Bajwa (10) Patent No.: US 12,456,547 B1
(45) Date of Patent: Oct. 28, 2025

(54) INTEROPERABLE MOBILE PLATFORM AND HL7 FHIR STANDARDIZED CONTACT TRACING SYSTEM AND METHODS FOR DESIGNING CONTACT TRACING APPLICATIONS USING THE HL7 FHIR STANDARD

(71) Applicant: Ozair Bajwa, SugarLand, TX (US)

(72) Inventor: Ozair Bajwa, SugarLand, TX (US)

( * ) Notice: Subject to any disclaimer, the term of this patent is extended or adjusted under 35 U.S.C. 154(b) by 108 days.

(21) Appl. No.: 18/135,013

(22) Filed: Apr. 14, 2023

Related U.S. Application Data (60) Provisional application No. 63/331,675, filed on Apr. 15, 2022.

(51) Int. Cl.
*G16H 30/20* (2018.01)

(52) U.S. Cl.
CPC .................. *G16H 30/20* (2018.01)

(58) Field of Classification Search
None
See application file for complete search history.

(56) References Cited

U.S. PATENT DOCUMENTS

| | | | | |
|---|---|---|---|---|
| 2013/0132109 A1* | 5/2013 | Mruthyunjaya | ....... | G16H 70/60 705/2 |
| 2016/0140830 A1* | 5/2016 | Hathorn | ................ | G08B 21/02 340/686.6 |
| 2020/0398110 A1* | 12/2020 | Kosowsky | ............. | A63B 69/36 |
| 2021/0327549 A1* | 10/2021 | Temkin | ................... | G16H 40/67 |
| 2022/0014876 A1* | 1/2022 | Yoo | ......................... | G16H 40/67 |
| 2022/0022821 A1* | 1/2022 | Rodgers | ................. | A61B 5/746 |
| 2022/0183508 A1* | 6/2022 | Kasper | ................... | B65D 83/06 |

FOREIGN PATENT DOCUMENTS

CN          108320814 A  * 7/2018

OTHER PUBLICATIONS

Narumanchi, Sai Shanmukha. "COVID-19 Contact Tracing Tool Focused on Privacy Protection." Order No. 28155575 Southern Illinois University at Carbondale, 2020. Ann Arbor: ProQuest. Web. Oct. 23, 2024. (Year: 2020).*

* cited by examiner

*Primary Examiner* — Lena Najarian
(74) *Attorney, Agent, or Firm* — Plager Schack LLP; Mark H. Plager; Stephen Hallberg (57) ABSTRACT

An interoperable mobile platform and HL7 FHIR standardized contact tracing system and methods for designing contact tracing applications using the HL7 FHIR standard are disclosed. The interoperable mobile platform and HL7 FHIR standardized contact tracing system and methods provide seamless integration of location data for contact tracing by capturing location data parameters from different mobile devices/software into the health system for contact tracing applications.

10 Claims, 6 Drawing Sheets

INTEROPERABLE MOBILE PLATFORM AND HL7 FHIR STANDARDIZED CONTACT TRACING SYSTEM AND METHODS FOR DESIGNING CONTACT TRACING APPLICATIONS USING THE HL7 FHIR STANDARD

CLAIM OF BENEFIT TO PRIOR APPLICATION

This application claims benefit to U.S. Provisional Patent Application 63/331,675, entitled "SYSTEMS AND METHODS FOR DESIGNING CONTACT TRACING APPLICATIONS USING HL7 FHIR STANDARD," filed Apr. 15, 2022. The U.S. Provisional Patent Application 63/331,675 is incorporated herein by reference.

BACKGROUND

Embodiments of the invention described in this specification relate generally to contact tracing systems and applications, and more particularly, to contact tracing systems and methods for designing contact tracing applications that utilize the Fast Health Interoperability Resources ("FHIR") standard, which is an implementation of the Health Level Seven International ("HL7") specification for healthcare interoperability (together referred to hereinafter as "HL7 FHIR" or the "HL7 FHIR standard").

Lack of precision and standards in gathering location data (hereinafter referred to as "location data") for patients impedes the ability of applications to perform accurate contact tracing and location tracking in healthcare fields. Also, there is currently a wide range of mobile devices, mobile operating systems, mobile applications, and mobile platforms which typically have interoperability problems. The consequence in healthcare is that patient data ends up scattered across various domains, making contact tracing in healthcare highly limited.

Some existing systems are available, but they are limited and such systems do not have a method of capturing precise location data parameters from multiple sources in an interoperable mobile platform. Also, as different mobile platforms evolve those mobile platforms bring their own native software and drivers. Consequently, there are no universal solutions across the various mobile platforms (e.g., Android, IOS, etc.) that provide seamless interoperability for contact tracing and location data interchange between devices of different mobile platforms.

Therefore, what is needed is a way to obtain or gather location data of health care patients for contact tracing in an interoperable mobile platform that is device-generic (any device, platform, type, or brand) and to do so on a standardized healthcare platform under the HL7 FHIR standard.

BRIEF DESCRIPTION

An interoperable mobile platform and HL7 FHIR standardized contact tracing system and methods for designing contact tracing applications using the HL7 FHIR standard are disclosed. In some embodiments, the interoperable mobile platform and HL7 FHIR standardized contact tracing system is configured to capture location data from different mobile devices, mobile appliances, and/or software, and then seamlessly incorporate the location-based contact tracing data into a health system for contact tracing applications. In some embodiments, the interoperable mobile platform and HL7 FHIR standardized contact tracing system is configured to capture location data from multiple sources in an interoperable mobile platform.

In some embodiments, the interoperable mobile platform and HL7 FHIR standardized contact tracing system comprises a data source, a personal health gateway, a client application, and a server. In some embodiments, the interoperable mobile platform and HL7 FHIR standardized contact tracing system further comprises a data storage that is communicably connected to the server. In some embodiments, the client application comprises a plurality of library and package resources. In some embodiments, the client application is installed on and configured to run on a personal health device of a user. In some embodiments, the personal health device is communicably connected to a personal health appliance.

In some embodiments, the data source comprises a personal health device of a user in combination with the client application. In some embodiments, the data source comprises the personal health device, combined with the client application, and a personal health appliance communicably connected to the personal health device. In some embodiments, the data source comprises a self-contained personal health appliance in combination with the client application.

In some embodiments, the client application comprises the personal health gateway as a runtime data conversion execution package. In some embodiments, the client application triggers the personal health gateway to perform runtime data conversion of location data and contact tracing data as captured and aggregated by the data source on the personal health device and/or in connection with a personal health appliance.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of an interoperable mobile platform and HL7 FHIR standardized contact tracing system and methods for designing contact tracing applications using the HL7 FHIR standard are described. The interoperable mobile platform and HL7 FHIR standardized contact tracing system and the methods for designing contact tracing applications using the HL7 FHIR standard implement the Fast Health Interoperability Resources (FHIR) standard, which is a Health Level Seven International (HL7) specification for healthcare interoperability. In particular, the interoperable mobile platform and HL7 FHIR standardized contact tracing system and the methods for designing contact tracing applications using the HL7 FHIR standard implement the HL7 FHIR standard for seamless integration of different mobile device hardware and operating system platforms, applications, and mobile/connected Internet of Things (IoT) appliances into any given health care system for contact tracing applications. However, it will be clear and apparent to one skilled in the art that the invention is not limited to the embodiments set forth and that the invention can be adapted for any of several applications. Also, all standards specified in this disclosure are by way of example only and are not intended to be limiting. Instead, the embodiments described in this specification intend to cover such anticipated updates to these standards (FHIR/HL7) over time. Furthermore, the relational connections shown in these Figures are not necessarily fully encompassing of all elements or steps that may be present in a detailed view of the same. For instance, a mobile device connection to a cloud server may be simply depicted in a one-to-one relationship, while a detailed view of the same may include hardware components such communication towers, wireless gateway devices, firewall appliances, routers, etc. As will be understood by those of ordinary skill in the relevant art, the actual elements, steps, and relationships between them, for any system, any device, combinations of a system and devices, or any part of a system or device disclosed in this specification will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "in one embodiment", "an embodiment", or "some embodiments" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises", and "comprised" are not intended to exclude other additives, components, integers, or steps.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Some embodiments of the invention include an interoperable mobile platform and HL7 FHIR standardized contact tracing system and methods for designing contact tracing applications using the HL7 FHIR standard. In some embodiments, the interoperable mobile platform and HL7 FHIR standardized contact tracing system provides seamless integration of location and incorporate contact tracing data (location data) into a health system. In some embodiments, the interoperable mobile platform and HL7 FHIR standardized contact tracing system is configured to capture location data from multiple sources in an interoperable mobile platform. In some embodiments, the interoperable mobile platform and HL7 FHIR standardized contact tracing system is configured to capture location data from different mobile devices, mobile appliances, and/or software, and then seamlessly incorporate the location-based contact tracing data into a health system for contact tracing applications.

In some embodiments, the interoperable mobile platform and HL7 FHIR standardized contact tracing system comprises a data source, a personal health gateway, a client application, and a server. In some embodiments, the interoperable mobile platform and HL7 FHIR standardized contact tracing system further comprises a data storage that is communicably connected to the server. In some embodiments, the client application comprises a plurality of library and package resources. In some embodiments, the client application is installed on and configured to run on a personal health device of a user. In some embodiments, the personal health device may be communicably connected to a personal health appliance. In some embodiments, the data source comprises a particular personal health device of a particular user in combination with the client application. In some embodiments, the data source comprises the personal health device, combined with the client application, and a personal health appliance communicably connected to the personal health device. In some embodiments, the data source comprises a self-contained personal health appliance. In some embodiments, the data source comprises a self-contained personal health appliance on which the client application is installed. In some embodiments, the client application comprises a software library and software packages configured to capture location data and contact tracing data from communications hardware of the personal health device and upload the location data and contact tracing data to the FHIR server. In some embodiments, the client application further comprises the personal health gateway as a runtime data conversion execution package. In some embodiments, the client application triggers the personal health gateway to perform runtime data conversion of the location data and contact tracing data to the HL7 FHIR standard.

In some embodiments, the interoperable mobile platform and HL7 FHIR standardized contact tracing system is configured to capture location data of the data source and upload the location data to the FHIR server. In some embodiments, the personal health device and the personal health appliance each comprise a Bluetooth communications device. The Bluetooth communications device of the personal health device is configured to connect to the Bluetooth communications device of the personal health appliance in a point-to-point network topology that supports one-to-one (1:1) device communications between the personal health device and the personal health appliance. In some embodiments, the location data captured by the personal health device is uploaded to the FHIR server by the client application in a FHIR server data bundle after the location data is converted to the HL7 FHIR standard by the personal health gateway. In some embodiments, the client application includes the medical and health data captured by the personal health device in the data bundle.

In some embodiments, the Bluetooth communications device is configured to conduct Bluetooth Low Energy ("BLE") point-to-point communications between the personal health device and the personal health appliance when paired to the personal health device. In some embodiments, the Bluetooth communications device broadcasts BLE signals that are detectable by other Bluetooth-enabled devices.

In some embodiments, the client application is configured to include user response data with the location data and the medical and health data (provided by the personal health appliance) in the FHIR data bundle. In some embodiments, the user response data is data input by the user of the personal health device in response to a questionnaire transmitted by the FHIR server to the personal health device. In some embodiments, the interoperable mobile platform and HL7 FHIR standardized contact tracing system is configured to convert both the location data and contact tracing data (from user-provided questionnaire responses) to a platform-generic form before bundling the location data, contact tracing data, the medical and health data, device data (for both PHD and any PHA), along with other questionnaire response data in the FHIR data bundle.

As stated above, lack of precision and standards in gathering location data for patients in healthcare results in impediments in contact tracing and location tracking applications. While there are some existing systems available, such systems do not have a method of capturing precise location data parameters from multiple sources in an interoperable mobile platform. Embodiments of the interoperable mobile platform and HL7 FHIR standardized contact tracing system and methods for designing contact tracing applications using the HL7 FHIR standard described in this specification solve such problems by leveraging industry standards, multiple location attributes from different sources, and automating the integration and conversion of a patient's location data. Specifically, the interoperable mobile platform and HL7 FHIR standardized contact tracing system and methods for designing contact tracing applications using the HL7 FHIR standard use the HL7 FHIR standard for seamless integration and capture of the spatial, location data of the patient and able to do so from different mobile devices/software for integration into the health system for contact tracing applications.

Embodiments of the interoperable mobile platform and HL7 FHIR standardized contact tracing system and methods for designing contact tracing applications using the HL7 FHIR standard described in this specification differ from and improve upon currently existing options. In particular, some embodiments differ because contact tracing/location tracking has not been implemented in healthcare in an industry backed standard. By contrast, the interoperable mobile platform and HL7 FHIR standardized contact tracing system and methods for designing contact tracing applications using the HL7 FHIR standard described in this specification provide software implementations in a hardware-based system that fill the void, utilizing the HL7 FHIR standard in terms of gathering the health care patient's geo-spatial location or location data. This is done in any of several manners including, without limitation, through cell tower location identification, identification of a WiFi gateway device, GPS, and/or Bluetooth BLE signaling and detection.

Furthermore, other existing devices and systems fail to account for the heterogeneity in the location/contact tracing data points. In essence, they do not use the industry/government backed standards to translate and merge the data in one universal standard. Hence, they lack the precision that might be possible when a single standard is employed and, therefore, cannot integrate with new devices and software. By utilizing the HL7 FHIR standard, the systems and methods for designing contact tracing applications of this disclosure provides for seamless integration and capturing location data parameters from different mobile devices/software into the health system.

The interoperable mobile platform and HL7 FHIR standardized contact tracing system of the present disclosure may be comprised of the following elements. This list of possible constituent elements is intended to be exemplary only and it is not intended that this list be used to limit the interoperable mobile platform and HL7 FHIR standardized contact tracing system of the present application to just these elements. Persons having ordinary skill in the art relevant to the present disclosure may understand there to be equivalent elements that may be substituted within the present disclosure without changing the essential function or operation of the interoperable mobile platform and HL7 FHIR standardized contact tracing system.

1. Personal Connected Health Appliances (e.g., health monitor devices, blood pressure measurement devices, etc.)
2. Mobile Devices (e.g., smartphones, tablet computing device, smart watches, etc.)
3. Application Client (also referred to as the "Flutter app", the "Flutter mobile app", or the "Flutter mobile application")
4. FHIR Server (hardware system with server software, the server may be configured to host a cloud application service with the hardware server located anywhere accessible via the Internet or through the "cloud")
5. Flutter/Dart libraries and packages (as provided through the application client)
6. HL7 FHIR Standard
7. Android Studio (optional, as Android Studio provides a development environment, yet any other development environment could be utilized)
8. Java
9. Personal Health Device (PHD) on which the application client is installed and runs, along with the Flutter/Dart libraries and packages-combined to form the "data source" with respect to capturing and uploading location and other data to the FHIR server
10. Personal Health Gateway (PHG) operationally connected to the application client and/or integrated into the application client
11. Personal Health Appliance (PHA) as optionally connected to the PHD to capture health data and vitals of a user The various elements of the interoperable mobile platform and HL7 FHIR standardized contact tracing system of the present disclosure may be related in the following exemplary fashion. It is not intended to limit the scope or nature of the relationships between the various elements and the following examples are presented as illustrative examples only. All personal connected health appliances and mobile devices are provisioned to communicate with the application client. Device data can also be gathered from the Flutter/Dart libraries in the application client (also referred to as the "Flutter app", the "Flutter mobile app", or the "Flutter mobile application"). Data from the personal connected health appliances, the mobile devices, and from the Flutter/Dart libraries/code is converted to the HL7 FHIR standard. The Flutter/Dart code is written in a development environment, such as (but not necessarily) Android Studio. The application client communicates with the personal connected health appliances and the mobile devices using Java. The application client connects over a network (e.g., the Internet) to the FHIR server using Flutter/Dart and leverages the HL7 FHIR Standard.

The methods for designing contact tracing applications using the HL7 FHIR standard of the present disclosure work by implementation to software (client application, as well as a server-side software running on the FHIR server or as a cloud application service hosted by the FHIR server) that has connection channels for different device types. For instance, an Android mobile device and an iOS mobile device both connect via corresponding channel. As the devices are registered and a connection is established, data flows from the devices to the personal health gateway and from the native device libraries on the personal health gateway (e.g., libraries for utilizing onboard communications hardware, or wirelessly connected devices, such as Bluetooth BLE communications between a personal health device and a personal health appliance, or between two different personal health devices in relative proximity to each other). All the data is converted at the personal health gateway to the HL7 FHIR standard and is matched to their respective patients. Based on the threshold defined for the client application, data will be uploaded to the FHIR server.

To make the interoperable mobile platform and HL7 FHIR standardized contact tracing system and implement the methods for designing contact tracing applications using the HL7 FHIR standard as software, a person would need to have or obtain a deep understanding of the HL7 FHIR standard and Flutter/Dart platforms. FHIR libraries are written in dart to support the mobile platform. Device data and the device location data from the native libraries interface with the Flutter platform through Bluetooth Low Energy (BLE). Flutter application is configured to natively collect GPS, cell tower, and Wi-Fi data. Flutter application is also configured to collect Bluetooth data natively or through general mobile devices (PHD) operated by users/patients and having the client application installed with Flutter/Dart libraries and packages, and/or installed directly on specialized mobile devices that are configured to provide a medical device function, such as by a self-contained personal health device (PHA) with the client application and Flutter/Dart libraries and packages installed. All data is sent to the translation layer written in Java where it is converted to a form supported by the HL7 FHIR standard. Flutter uses platform method channel calls to fetch data (such as location data, device data, questionnaire response data, etc.) and then merge the data with patient records before uploading all of the data (bundle of data) to the FHIR server. Adaptations can be applied to optionally monitor and observe thresholds and provide workflow configuration(s) based on the clinician feedback.

To use the interoperable mobile platform and HL7 FHIR standardized contact tracing system of the present disclosure, one can deploy on a smart device on demand or through an app store, but it is anticipated to be available in native and mobile web formats. It is targeted to be used in a remote setting where patient data (including location data, contact history, etc.) is collected, normalized, and persisted with other patient records in realtime. The data is uploaded to a central FHIR server where it can be accessed by the end users (providers, public health repositories, pharmacies, insurance companies) for various contact tracing applications.

Figure 1:
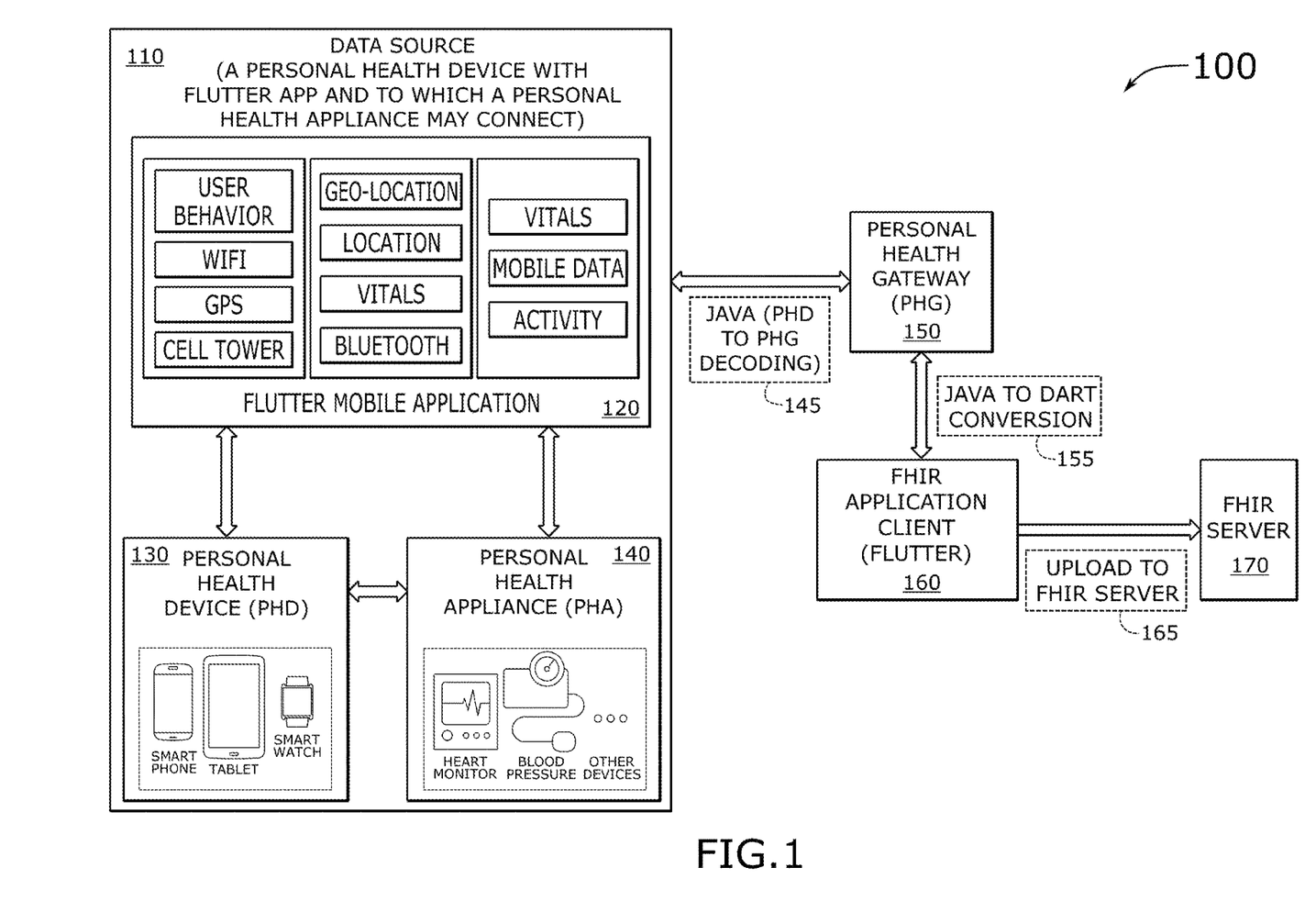
FIG. 1 conceptually illustrates an interoperable mobile platform and HL7 FHIR standardized contact tracing system in some embodiments.

By way of example, FIG. 1 conceptually illustrates an interoperable mobile platform and HL7 FHIR standardized contact tracing system 100 that is configured to capture location data of a data source 110 and upload the location data to a FHIR server 170. As shown in this figure, the interoperable mobile platform and HL7 FHIR standardized contact tracing system 100 includes the data source 110, a personal health gateway (PHG) 150, a FHIR application client 160, and the FHIR server 170. The data source 110 includes a plurality of libraries and packages 120 of a mobile application implementation of the FHIR application client 160.

The plurality of libraries and packages 120 shown in this figure are individually referred to as modules and include a user behavior module, a WiFi module, a GPS module, a cell tower module, a geo-location module, a location module, a first vitals module, a second vitals module, a Bluetooth module, a mobile data module, and an activity module. The plurality of libraries and packages 120 each communicate with one or more corresponding hardware resources. For instance, the user behavior module may interface with a touch screen, the WiFi module may interface with a wireless network adapter, the GPS module may interface with a GPS hardware system/chip, the cell tower module may interface with an onboard cellular communications module, the geo-location module and/or the location module may interface with a combination of WiFi, GPS, and cell tower to calculate proximate location, the first vitals module may interface with an externally connected health monitor device, the second vitals module may interface with an externally connected blood pressure device, the Bluetooth module may interface with a Bluetooth communications device which itself may be configured to provide point-to-point communication with externally connected devices (e.g., health monitor, blood pressure device, and other externally connected medical and health devices), and the mobile data module and the activity module may interface with system memory, persistent storage, and/or onboard execution unit(s) of a host device.

In addition to the plurality of libraries and packages 120 and mobile application implementation of the FHIR application client 160, the data source 110 includes a personal health device 130 and a personal health appliance 140. The data source 110 may be configured as a combination of the personal health device 130 and the plurality of libraries and packages 120 of the mobile application implementation of the FHIR application client 160, which is installed on the personal health device 130. Examples of personal health devices 130 include, without limitation, mobile devices, smartphones, tablet computing devices, smart watches, and other personal mobile devices.

The personal health device 130 may (or may not) be communicably connected to the personal health appliance 140. Examples of personal health appliances include, without limitation, heart monitors, blood pressure devices, health monitors, or another type of medical or health device configured to wirelessly connect to the personal health device 130 via BLE point-to-point communication. On the other hand, the personal health appliance 140 may be a self-contained personal health appliance 140 that includes hardware and software resources for medical and health applications and hardware/software resources of a single board computer ("SBC"), printed circuit board ("PCB") and processing unit, and/or a mobile processor and corresponding integrated circuits for communications, activity, etc. (such as fully integrated smart device health appliance with a screen interface like a smartphone, tablet, and/or smartwatch). As a fully integrated electronic communications and digital processing device, the self-contained personal health appliance 140 would have the mobile application implementation of the FHIR application client 160 and the plurality of libraries and packages 120 installed in a local persistent storage and configured to run on the processing unit. However, in typical scenarios, the personal health appliance 140 is communicably connected to the personal health device 130 through a point-to-point BLE data communication channel as provided by Bluetooth communication devices on both. When so configured, the mobile application implementation of the FHIR application client 160 and plurality of libraries and packages 120 would be installed in persistent storage of the personal health device 130 and execute on a processing unit of the personal health device 130, yet be able to work with data captured by the externally connected personal health appliance 140.

The data source 110 shown in this figure captures location data. The location data is captured by triggering one or more of the WiFi module, the GPS module, the cell tower module, and the Bluetooth module to provide their respect location-based data. For instance, the WiFi module may retrieve the name of a WiFi gateway device to which the personal health device 130 is either connected or nearby, the GPS module may receive location data from a plurality of satellites of a GPS system and provide the location data to the geo-location module and/or the location module to calculate current geospatial location of the personal health device 130, the cell tower module may retrieve a known and fixed location of a nearby cell tower to which the personal health device 130 is connected or retrieve the locations of multiple cell towers to triangulate a relative position of the personal health device 130, or the Bluetooth module may broadcast BLE signals which, when detected by another BLE-enabled device with the mobile application implementation of the FHIR application client 160 and the plurality of libraries and packages 120 installed, allow location data to be captured based on signal strength (since a BLE broadcast signal attenuates in strength over distance).

Whatever the source of the captured location data, the data source 110 provides the location data in a Java format to the personal health gateway 150. As shown in dashed box 145, this involves decoding the Java form from the data source 110 (typically the personal health device 130 but may be a self-contained version of the personal health appliance 140) to a form suitable for the personal health gateway 150. Similarly, as shown in dashed box 155, the personal health gateway 150 performs Java to Dart conversion of the location data and provides back to the FHIR application client 160. Then the FHIR application client 160 uploads the data to the FHIR server 170, as shown in dashed box 165.

Figure 2:
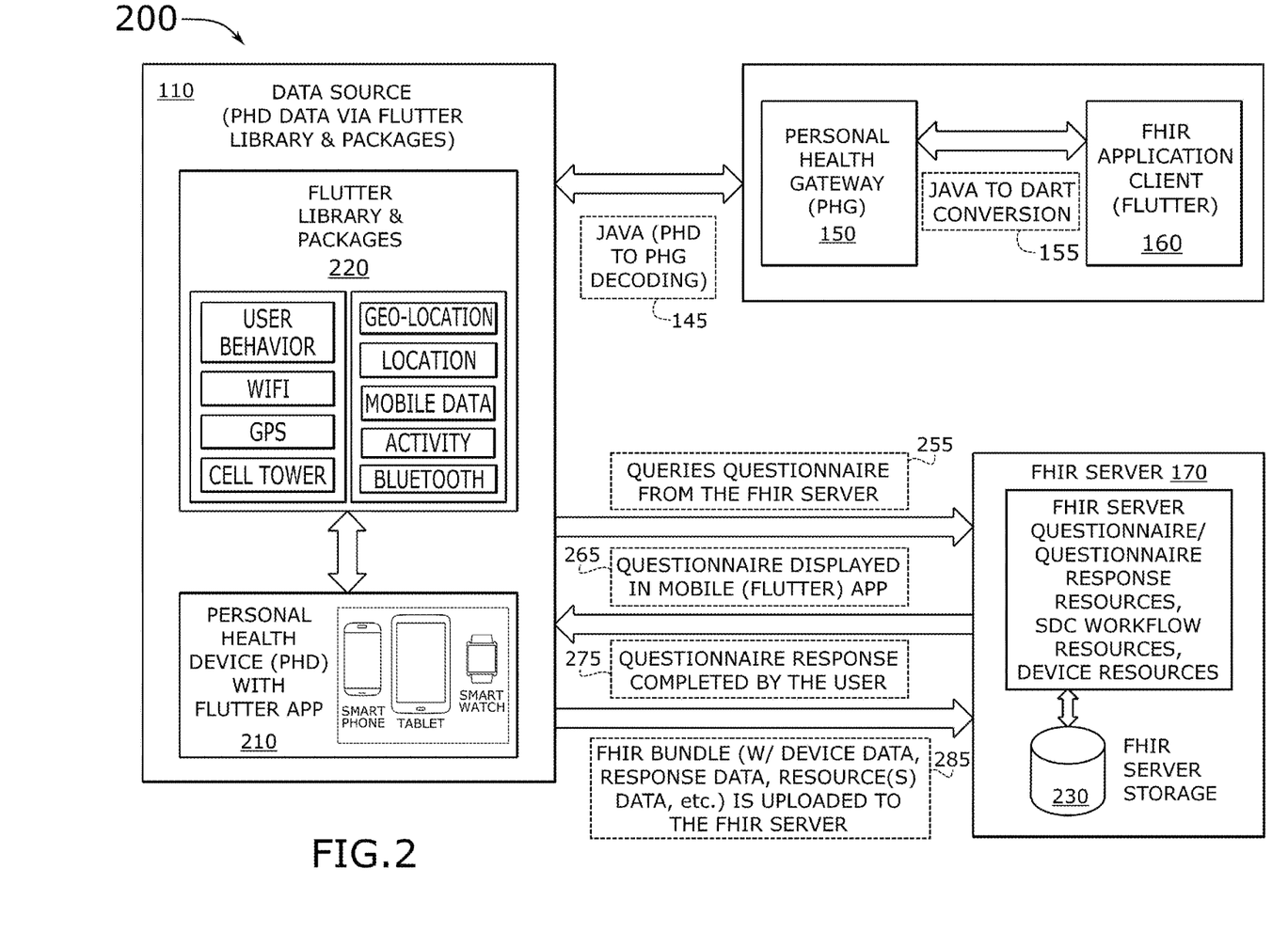
FIG. 2 conceptually illustrates the interoperable mobile platform and HL7 FHIR standardized contact tracing system as configured to capture and upload location data of the personal health device to the FHIR server in some embodiments.

Turning to another example, FIG. 2 conceptually illustrates the data source of the interoperable mobile platform and HL7 FHIR standardized contact tracing system as including a personal health device with a client application and flutter libraries and packages, without presence of an externally connected personal health appliance 200. As shown, a client application (implementation of the FHIR application client 160) is installed on a personal health device 210 and flutter libraries and packages 220 are provided on the personal health device 210 as an integrated data source 110. The flutter libraries and packages 220 are utilized by the client application on the personal health device 210 to capture and upload location data and contact tracing data from questionnaire responses, as well as device data and other data, to the FHIR server 170.

In this example, the flutter libraries and packages 220 are shown to include the user behavior module, the WiFi module, the GPS module, the cell tower module, the geo-location module, the location module, the mobile data module, the activity module, and the Bluetooth module, without the first vitals module and the second vitals module. However, it is possible that the flutter libraries and packages 220 include one or more of the first vitals module and/or the second vitals module (or additional/other vitals, health, medical modules).

As noted above, after the location data is captured by the data source 110, the location data (and any corresponding contact tracing data) is decoded from Java form to a form suitable for the personal health gateway 150 and then provided to the personal health gateway 150 which completes the Java to Dart data conversion, shown in dashed box 155, and back to the FHIR application client 160.

The data source 110 also queries for a questionnaire from the FHIR server 170, as shown in dashed box 255. In particular, the FHIR server 170 stores contact tracing and other medical/health questionnaires, questionnaire responses, resource data, workflows, and device resource data in a FHIR server storage 230. Thus, querying for a questionnaire results in the questionnaire being retrieved from the FHIR server storage 230 by the FHIR server 170 and transmitted, as shown in dashed box 265, back to the personal health device 210 for display within the application client 160. The user then completes the questionnaire by inputting responses on the personal health device 210, as shown in dashed box 275. Once completed, the FHIR application client 160 aggregates all data (including location data as converted to HL7 FHIR form, contact tracing data, device data, responsive questionnaire data, etc.) and prepares a FHIR data bundle to upload to the FHIR server 170, as demonstrated in dashed box 285. The FHIR server 170 provides the FHIR data bundle to the contact tracing application of the corresponding health system and also persistently stores the data in encrypted form in the FHIR server storage 230.

In some embodiments, the data source comprises a personal health device of a user in combination with the client application and a personal health appliance that is externally and wirelessly connected to the personal health device operated by the user. In some embodiments, the interoperable mobile platform and HL7 FHIR standardized contact tracing system is configured to bundle the location data with medical data from the externally and wirelessly connected personal health appliance, along with questionnaire response data as provided by a user of the personal health device. This variation, in which medical data of a patient is provided with the location and contact tracking data (and questionnaire data), is described next, by reference to FIG. 3.

Figure 3:
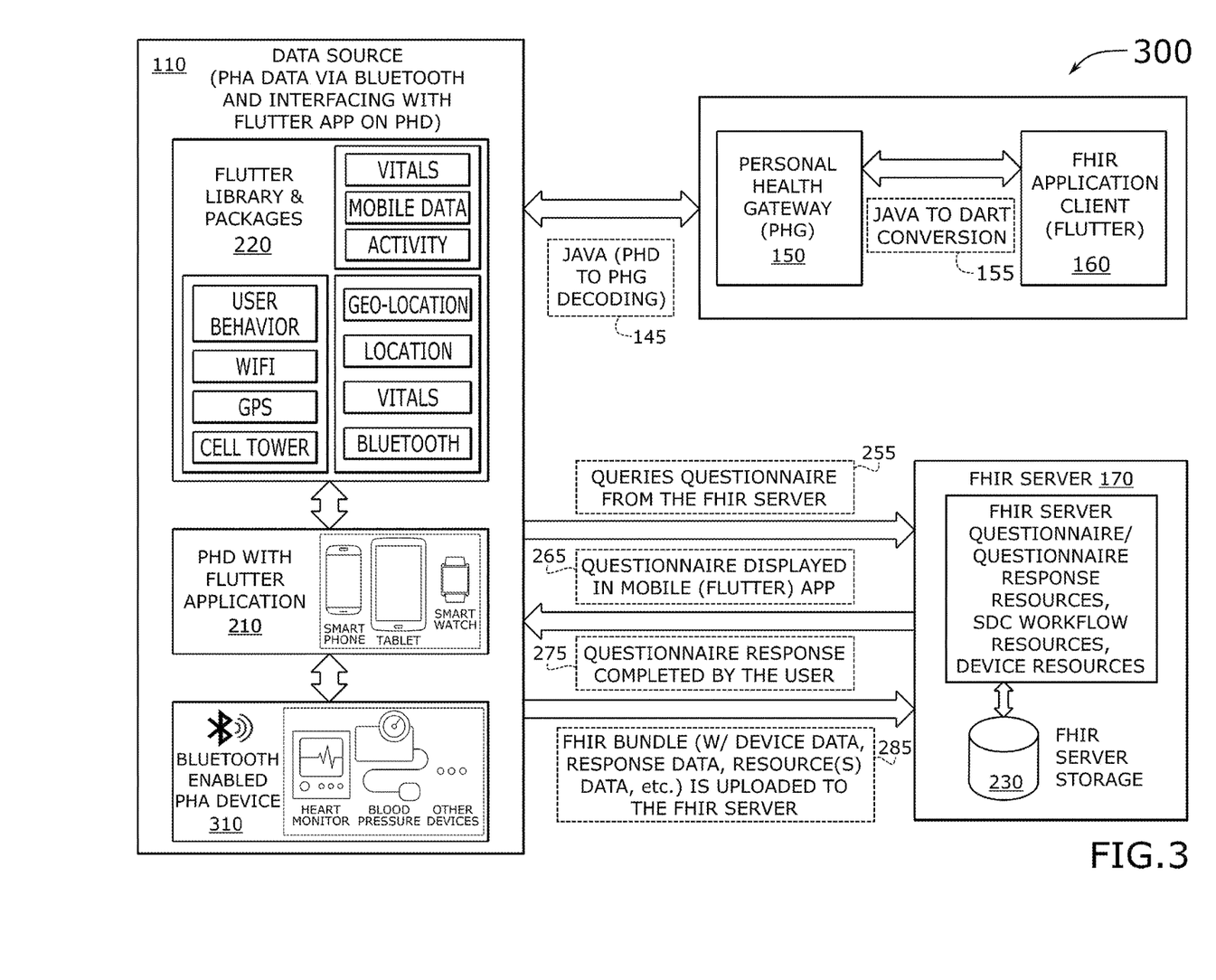
FIG. 3 conceptually illustrates the interoperable mobile platform and HL7 FHIR standardized contact tracing system as configured to capture location data of the personal health device with a connected personal health appliance and upload the location data to the FHIR server in some embodiments.

Specifically, FIG. 3 conceptually illustrates the interoperable mobile platform and HL7 FHIR standardized contact tracing system as configured to capture location data of the personal health device with a connected personal health appliance and upload the location data to the FHIR server 300. By contrast to the flutter library and packages described above, by reference to FIG. 2, the flutter library and packages 220 shown in this figure include the user behavior module, the WiFi module, the GPS module, the cell tower module, the first vitals module, the mobile data module, the activity module, the geo-location module, the location module, the second vitals module, and the Bluetooth module.

Also, a Bluetooth-enanbled personal health appliance 310 is wirelessly connected to the personal health device 210, which provides the user's medical/health data (as measured by the appliance) to the personal health device 210 over a BLE point-to-point communication connection between the personal health device 210 and the personal health appliance 310. The other operations are similar to those described above, by reference to FIG. 2. That is, the location data and all other data (including the user's medical data from the appliance 310) is decoded and converted, as shown in dashed boxes 145 and 155 with respect to the personal health gateway 150, and then provided back to the FHIR application client 160. The questionnaire is retrieved, shown in dashed box 255, by querying the FHIR server 170, which provides and displays the questionnaire, shown in dashed box 265, on the screen of the personal health device 210 operated by the user. The user completes the questionnaire, shown in dashed box 275, via the personal health device 210. Finally, the application client 160 on the personal health device 210 aggregates all the data (the location data, the contact tracing data, the medical/health data captured by the personal health appliance 310, the questionnaire response data, device data, etc.) into the FHIR data bundle for upload by the personal health device 210 to the FHIR server 170 for distribution to the associated health system and persistent, encrypted storage in the FHIR server storage 230.

Notably, the personal health appliance 310 is wirelessly connected to the personal health device 210 via Bluetooth. In this case, the personal health device 210 and the personal health appliance 310 would each have their own Bluetooth communications device. In some embodiments, the Bluetooth communications device of the personal health appliance 310 is configured to connect to the Bluetooth communications device of the personal health device 210 over a direct point-to-point communication channel in which the point-to-point communication channel is defined by a wireless network topology supporting one-to-one (1:1) device communications between the personal health device 210 and the personal health appliance 310. Furthermore, the Bluetooth communications device may be configured to conduct Bluetooth Low Energy ("BLE") point-to-point communications between the personal health device 210 and the personal health appliance 310 when paired to the personal health device 210. On the other hand, the Bluetooth communications device may also be configured to broadcast BLE signals as a beacon that is able to be detected by other Bluetooth-enabled devices. Configurations in support of beacon-like BLE broadcast signaling are described further below, by reference to FIG. 5.

Figure 4:
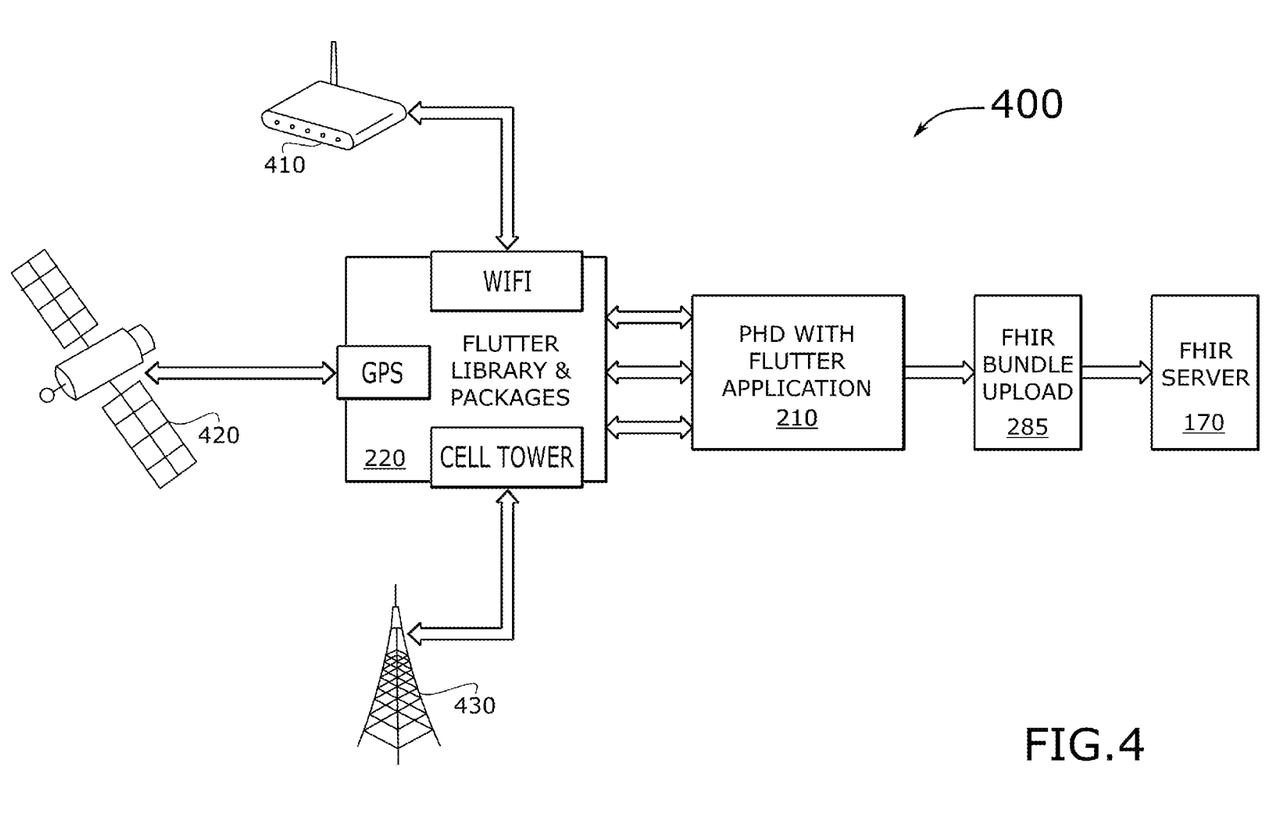
FIG. 4 conceptually illustrates location data acquisition by communications hardware of a personal health device and location data upload to the FHIR server of the interoperable mobile platform and HL7 FHIR standardized contact tracing system for contact tracing applications in some embodiments.

Next, however, details of capturing location data are described, by reference to FIG. 4. Specifically, FIG. 4 conceptually illustrates location data acquisition by communications hardware 400 of a personal health device and location data upload to the FHIR server of the interoperable mobile platform and HL7 FHIR standardized contact tracing system for contact tracing applications.

As shown in this figure, location data acquisition by communications hardware 400 involves external communications hardware devices comprising a WiFi gateway device 410, a satellite of a global positioning system 420, and a communications tower 430 of a mobile data and cellular communications system.

The data source 110 in this example is the personal health device 210 with the client application and the flutter library and packages 220 installed. As the personal health device 210 is typically a mobile device, such as a smartphone, a tablet computing device, or a smart watch, it is understood that the personal health device 210 includes a system-on-chip ("SoC") hardware communications module comprising one or more of a WiFi integrated circuit ("I/C") and antenna, a GPS chip and antenna, and a cellular communications I/C and antenna. Furthermore, the SoC hardware communications module may also include a Bluetooth communications device and/or other communications hardware.

The hardware communication devices correspond to modules of the flutter library and packages 220. For instance, the WiFi I/C and antenna corresponds to the WiFi module of the flutter library and packages 220, the GPS chip and antenna corresponds to the GPS module of the flutter library and packages 220, and the cellular communications I/C and antenna corresponds to the cell tower module of the flutter library and packages 220. In this way, the WiFi module of the flutter library and packages 220 can retrieve identifying information about a nearby or connected WiFi gateway device 410, the GPS module can receive location data from the satellite of the global positioning system 420 (typically three or more satellites), and the cell tower module can retrieve specific fixed location data from a nearby communications tower 430.

After location data is obtained, the location data is ingested by the client application on the personal health device 210, converted to the HL7 FHIR standard form, and aggregated into the FHIR data bundle for upload 285 (along with other relevant data, such as contact tracing information, device data, other patient data, etc.) to the FHIR server 170. In this way, the interoperable mobile platform and HL7 FHIR standardized contact tracing system is able to provide location data of users, regardless of the mobile platforms of their respective mobile health devices and/or mobile health appliances, to a health system for contact tracing applications.

As noted above, the communications hardware (e.g., SoC communications module) of a personal health device may include a Bluetooth low energy ("BLE") communications device that is configured broadcast low energy signaling. Low energy Bluetooth signaling (hereinafter referred to as "BLE signals") operationally configure the host device (such as the personal health device of the user) to act as a Bluetooth beacon which other Bluetooth-enabled devices can detect. In fact, the signal strength of a detectable BLE signal provides an approximate measure of distance from a detecting device. The measure of distance can be used by the device to determine location of self (e.g., the personal health device detecting a BLE signal) and the detected Bluetooth beacon source (the other personal health device). This is demonstrated next, by reference to FIG. 5.

Figure 5:
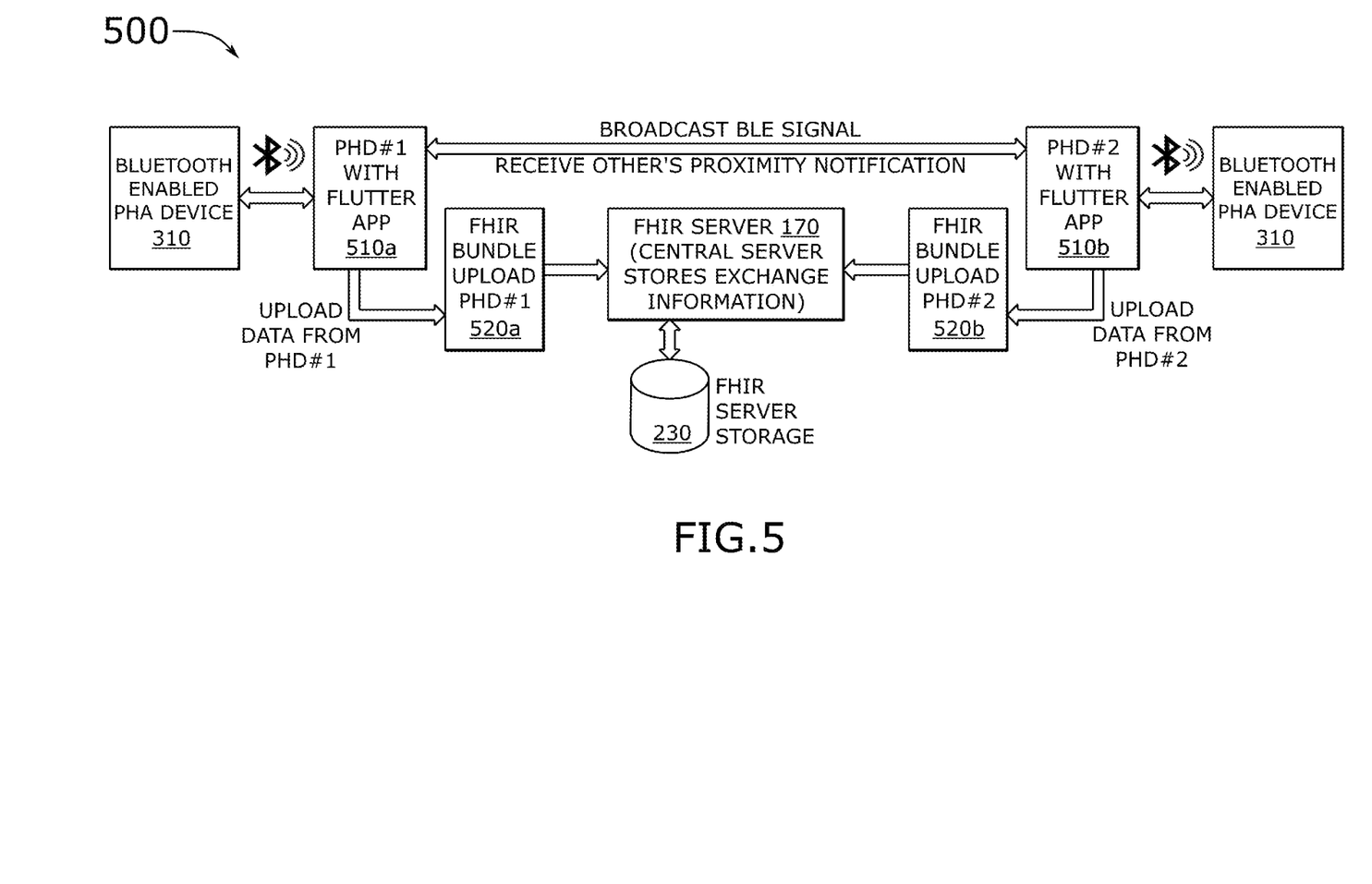
FIG. 5 conceptually illustrates location data acquisition by BLE detection between different personal health devices and location data upload to the FHIR server by each of the personal health devices in some embodiments.

Specifically, FIG. 5 conceptually illustrates location data acquisition by BLE detection between different personal health devices 500 and location data upload to the FHIR server by each of the personal health devices. As shown in this figure, location data acquisition by BLE detection between different personal health devices 500 comprises a first personal health device with client application 510a, a Bluetooth-enabled personal health device 310 in a point-to-point BLE connection to the first personal health device with client application 510a, a second personal health device with client application 510b, and another Bluetooth-enabled personal health device 310 in a point-to-point BLE connection to the second personal health device with client application 510b. Both the first personal health device with client application 510a and the second personal health device with client application 510b are Bluetooth-enabled mobile devices that are configured to conduct point-to-point communications with their respective paired personal health appliance 310 and to conduct BLE signal broadcasting. When either personal health device 510a and/or 510b detects the BLE broadcast signal of the other device, they can determine relative location. In some embodiments, the personal health device receives the other device's proximity notification as the signal at a certain strength. Depending on the strength of the signal, which attenuates over distance, the detecting personal health device can determine its and the other device's relative location. Typically, when one of the personal health devices detects the BLE broadcast signal of the other device, both of the personal health devices 510a and 510b will be able to detect the BLE signal of the other. In this way, the client application running on the first personal health device 510a can aggregate the location data with other relevant device, patient, and medical data into the FHIR data bundle 520a to upload to the FHIR server 170. Similarly, the client application running on the second personal health device 510b can aggregate the location data with other relevant device, patient, and medical data into the FHIR data bundle 520b to upload to the FHIR server 170. Since the FHIR server 170 is a central server, it can receive the FHIR data bundles 520a and 520b from both the first personal health device 510a and the second personal health device 510b and store the exchanged information in the FHIR server storage 230.

The above-described embodiments of the invention are presented for purposes of illustration and not of limitation. Furthermore, many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software" and "application" (or "app") are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
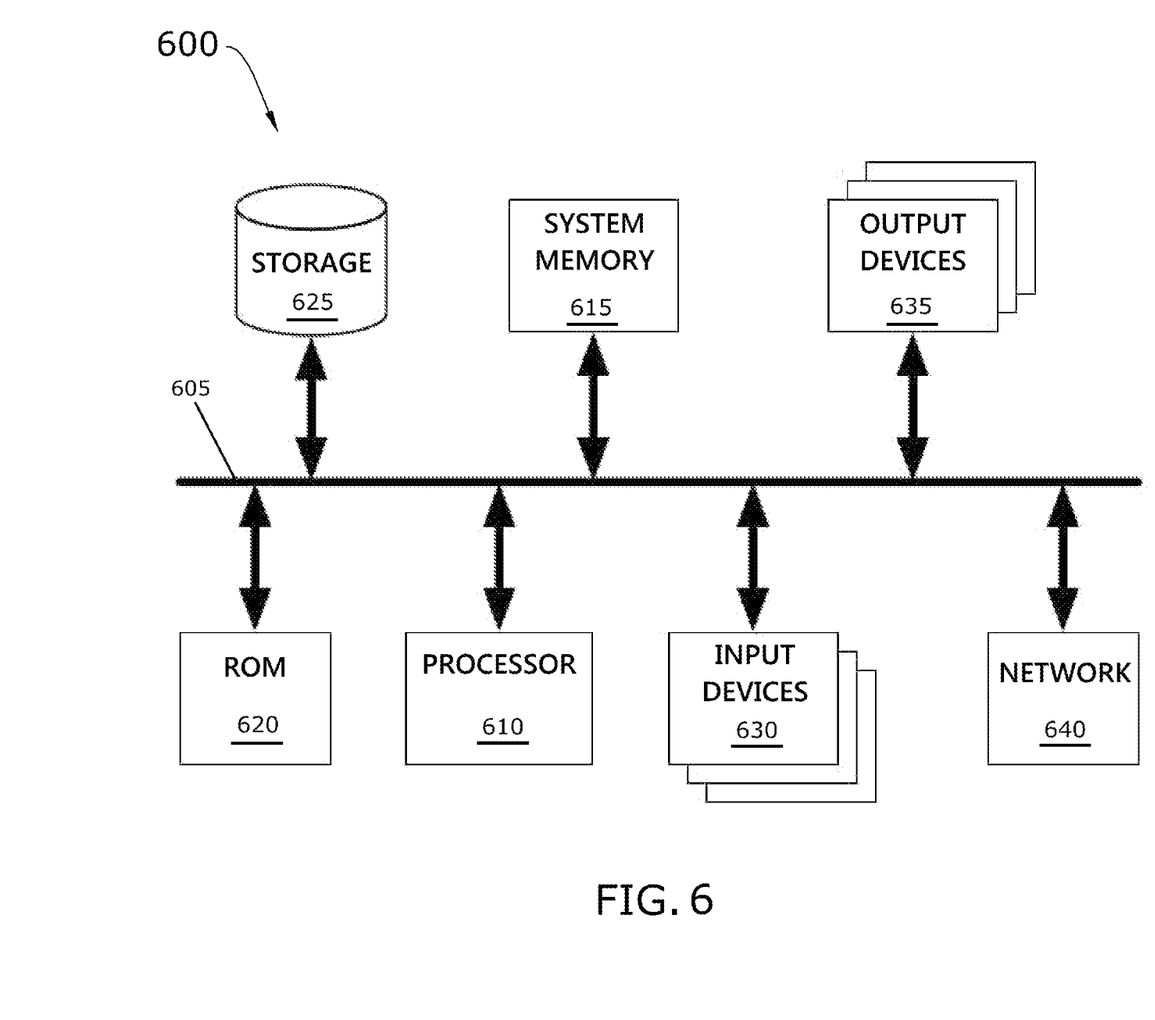
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive, or a solid state device (SSD), etc.) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. For example, the various memory units include instructions for processing sensor data in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards, pointing or cursor control devices, touch gestures of users on touchscreen interfaces, communicably connected wearable devices (such as personal health appliances, smart watches, etc.). The output devices 535 include printers and display devices, such as liquid crystal displays (LCD) and organic light emitting diode (OLED) displays. Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-5 conceptually illustrates steps of methods or processes. The specific operations of these methods/processes may not be performed in the exact order shown and described. Specific operations may not be performed in one continuous series of operations, and different specific operations may be performed in different embodiments. Furthermore, the methods/processes could be implemented using several sub-methods or sub-processes, or as part of a larger macro method or process. Thus, one of ordinary skill in the art would understand that the invention is not to be limited by the foregoing illustrative details, but rather is to be defined by the appended claims.

I claim:

1. An interoperable mobile platform and a Health Level Seven International (HL7) Fast Health Interoperability Resources (FHIR) standardized contact tracing system comprising:

a data source comprising a personal health device (PHD) with an integrated global positioning system (GPS) device that receives location information about the PHD and an installed mobile application ("mobile app"), wherein the PHD is operable by a user and is communicably connected to a personal health appliance (PHA) operable by the user, wherein the data source is configured to capture (i) location data of the PHD through the mobile app via the integrated GPS device of the PHD and (ii) health vitals data of the user through the mobile app via the PHA;

a FHIR server connected to a computer network system that leverages the HL7 FHIR standard and is configured to receive data (i) collected by a plurality of different types of devices that are remotely connected to the computer network system and (ii) converted to data that conforms to the HL7 FHIR standard;

a personal health gateway (PHG) connected to the FHIR server over the computer network system and to which the PHD connects, wherein the data source provides (i) the location data in Java form to the PHG when the PHD is connected to the PHG and (ii) the health vitals data in Java form to the PHG when the PHD is connected to the PHG, wherein the PHG decodes the Java form of the location data, the Java form of the health vitals data, and any corresponding contact tracing data to another form suitable for the PHG; and a FHIR application client implemented by the mobile app that runs on the PHD and is configured to (i) receive the decoded data from the PHG after the PHG converts the data from Java to Dart data and (ii) upload the Dart data to the FHIR server for real time remote patient monitoring.

2. The system of claim 1, wherein the data source further comprises a plurality of libraries and packages of the mobile app implementation of the FHIR application client.

3. The system of claim 2, wherein the plurality of libraries and packages comprise a user behavior module, a WiFi module, a GPS module, a cell tower module, a geo-location module, a location module, a first vitals module, a second vitals module, a Bluetooth module, a mobile data module, and an activity module.

4. The system of claim 1, wherein the PHA is a first PHA of the data source, wherein the data source further comprises a second PHA.

5. The system of claim 4, wherein the PHD is communicably connected to each of the first PHA and the second PHA by way of a wireless point-to-point communication connection.

6. The system of claim 5, wherein the first PHA comprises a health monitor.

7. The system of claim 5, wherein the first PHA comprises a first medical device and the second PHA comprises a second medical device.

8. The system of claim 7, wherein the first medical device comprises a heart monitor.

9. The system of claim 7, wherein the second medical device comprises a blood pressure device.

10. The system of claim 1, wherein the GPS device receives the location information from a plurality of GPS satellites.

* * * * *